(12) United States Patent
Yamada et al.

(10) Patent No.: US 6,832,606 B2
(45) Date of Patent: Dec. 21, 2004

(54) WIRE SAW AND CUTTING METHOD THEREOF

(75) Inventors: Kiyoshi Yamada, Tokyo (JP); Nobuo Otake, Tokyo (JP); Hirofumi Takei, Tokyo (JP)

(73) Assignee: Dowa Mining Co., Ltd., Tokyo (JP)

( * ) Notice: Subject to any disclaimer, the term of this patent is extended or adjusted under 35 U.S.C. 154(b) by 0 days.

(21) Appl. No.: 10/279,723

(22) Filed: Oct. 25, 2002

(65) Prior Publication Data

US 2003/0089362 A1 May 15, 2003

(30) Foreign Application Priority Data

Nov. 30, 2001 (JP) ........................................ 2001-366517

(51) Int. Cl.⁷ ................................................ B28D 1/04
(52) U.S. Cl. .............................. 125/13.01; 125/16.02; 451/60
(58) Field of Search ................................ 125/13.01, 21, 125/16.01, 16.02; 451/36, 60, 446

(56) References Cited

U.S. PATENT DOCUMENTS 5,827,113 A    10/1998  Okuno et al.
6,390,896 B1 *  5/2002  Huber et al. ................... 451/59
6,408,840 B2 *  6/2002  Ishida ........................... 125/21
6,422,067 B1 *  7/2002  Oishi et al. ................. 73/54.28
6,505,394 B2 *  1/2003  Chikuba et al. ............... 29/557

OTHER PUBLICATIONS

Office Action issued by the Patent Office of the People's Republic of China issued Mar. 5, 2004 in connection with corresponding application filed in China.

Republic of China Office Action, dated Mar. 5, 2004.

* cited by examiner

Primary Examiner—Lee D. Wilson
(74) Attorney, Agent, or Firm—Rader, Fishman & Grauer PLLC

(57) ABSTRACT

When a work W is cut by moving a wire in an axial direction thereof while the wire is pressed onto the work and an abrasive liquid which is made by dispersing abrasive grains in a dispersion medium is interposed between the work and the wire, a flow of the wire is formed, and the wire is pressed onto the work while moving under the liquid level of the abrasive liquid whose flow is formed. The work is cut in the abrasive liquid so that a sufficient amount of the abrasive grains can be supplied between the work and the wire for a long time.

5 Claims, 2 Drawing Sheets

WIRE SAW AND CUTTING METHOD THEREOF

BACKGROUND OF THE INVENTION

1. Field of the Invention

The present invention relates to a wire saw which cuts a work by moving wires to which an abrasive liquid adheres while pressing the wires onto the work and to a cutting method thereof.

2. Description of the Related Art

A wire saw is used as a device for cutting various stick-shaped works such as magnetic materials, semiconductor materials, and ceramic materials. This wire saw is so structured that a wire repeatedly moving back and forth is wound between a pair of main rolls a plurality of times at regular spaced intervals, an abrasive liquid is supplied to the surface of the wires arranged at the regular spaced intervals to cause abrasive grains dispersing in the abrasive liquid to adhere to the wire, and the wires with the abrasive grains adhering thereto are moved while being pressed onto a work, thereby cutting the work into many plate-shaped pieces at one cutting operation.

In the conventional wire saw, a supply nozzle opening along the whole length of the work in a longitudinal direction thereof is disposed above the wire array immediately before entering the work and the abrasive liquid is dropped onto the wires from the supply nozzle, thereby supplying the abrasive grains to cut positions of the work. In this case, it is necessary that the abrasive grains adhere firmly enough onto the surfaces of a large number of the wires in order to obtain high efficiency in machining and high precision in cutting. Therefore, the abrasive liquid is prepared by mixing the abrasive grains in a liquid medium of oil or the like with a relatively high viscosity so that the abrasive grains easily adhere to the surfaces of the wires. Further, in order to uniformly supply the abrasive liquid over the entire length of the wires, used are a supply nozzle structured by a single tube whose diameter widens from an inlet port for the abrasive liquid toward its downstream side and a supply nozzle structured by combining two tubes with different diameters, thereby making it possible to supply the abrasive liquid uniformly over the whole length of the supply nozzle.

Chips adhering onto the surfaces of the wires after the work is cut are continuously washed away by the abrasive liquid. The chips washed away from the surfaces of the wires drop downward together with the abrasive liquid to be collected in a receiving vessel.

The conventional wire saw, however, has a problem that the supply nozzle is clogged in a short time due to fine grains and grinding dust (chips and sludge) which are caused by the cutting operation so that the amount of the abrasive grains adhering onto the wires is not uniform over the whole length of the work, thereby changing the thickness of the work and roughening the cut surfaces of the work. Further, since the clogging of the supply nozzle disenables the supply of the abrasive liquid onto the wires, thereby causing wire breakage, the problem is caused that the cutting work cannot be continued for a long time.

Further, in the conventional method in which the abrasive liquid is dropped right onto the wires from the supply nozzle, the abrasive grains adhere onto the wires only by surface tension of the abrasive liquid, and most of the abrasive grains drop off the wires, and therefore, the degree of their adhesiveness greatly varies depending on the viscosity of the abrasive liquid and the supply amount from the supply nozzle. Due to deterioration of flowability in accordance with the increase in the amount of the chips mixed therein, the abrasive liquid used for the cutting work for a long time stays at a horizontal pipe portion and the like when the operation of the wire saw is stopped, and the abrasive grains hang together in the pipe to easily clog the pipe. Moreover, the abrasive grains which hang together close the opening of the supply nozzle, which causes the wire breakage more often.

SUMMARY OF THE INVENTION

The present invention is made in view of the above and it is an object of the present invention to provide a wire saw which can cut a work in a good condition for a long time and to provide a cutting method thereof.

The present invention is a wire saw comprising a wire for cutting a work while being pressed onto the work and moving in an axial direction thereof, and an abrasive liquid, which is made by dispersing abrasive grains in a dispersion medium, interposed between the work and the wire, the wire saw being so structured that a flow of the abrasive liquid is formed and the wire moves under the liquid level of the abrasive liquid whose flow is formed.

For example, this wire saw is so structured that the abrasive liquid is continuously supplied to a vessel to cause the abrasive liquid to continuously flow out of an upper surface opening of the vessel and the wire moves under the liquid level of the abrasive liquid which is flowing out. In this case, the wire saw may also be so structure that a higher position and a lower position are provided on upper ends of side surfaces of the vessel and the abrasive liquid flows out at the lower position. Further, it is also suitable that a pair of main rolls for guiding the wire to move horizontally in the upper surface opening of the vessel are disposed on both sides of the vessel, the lower position is formed in a position lower than the wire which moves between these main rolls, and upper ends of circumferential surfaces of these main rolls are positioned higher than the lower position and lower than the higher position.

Another aspect of the present invention is a method of cutting a work in which, when the work is cut by moving a wire in an axial direction thereof while the wire is pressed onto the work and an abrasive liquid which is made by dispersing abrasive grains in a dispersion medium is interposed between the work and the wire, a flow of the abrasive liquid is formed and the wire is pressed onto the work while being moved under a liquid level of the abrasive liquid whose flow is formed.

According to the present invention, the work is cut in the abrasive liquid so that a sufficient amount of the abrasive grains can be supplied between the work and the wire for a long time. Thereby, the operation can be continued for a long time since wire breakage is prevented, and the surfaces of cut pieces of the work can be maintained in a uniform and good condition, which can greatly contribute to improvement in productivity of wire saw cutting.

DETAILED DESCRIPTION OF THE PREFERRED EMBODIMENT

Figure 1:
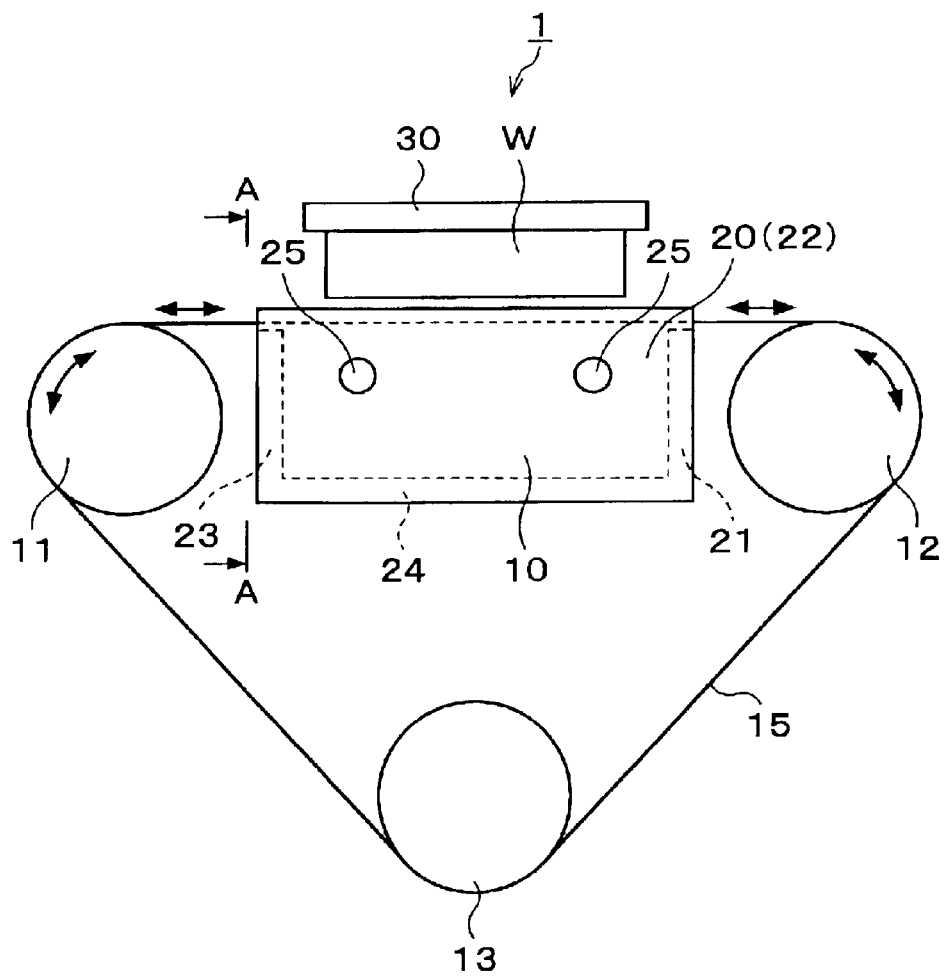
FIG. 1 is a front view of an essential part of a wire saw according to an embodiment of the present invention.
Figure 2:
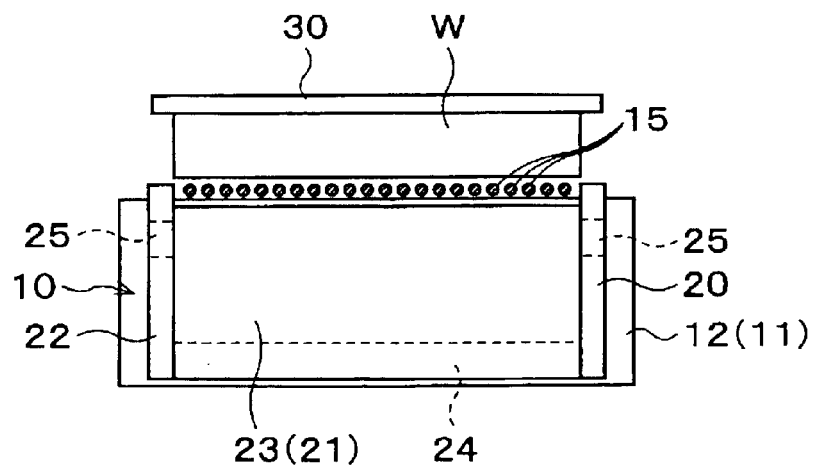
FIG. 2 is a cross sectional view taken along the A—A line in FIG. 1.

A preferred embodiment of the present invention will be hereinafter explained with reference to the drawings. FIG. 1 is a front view of an essential part of a wire saw 1 according to the embodiment of the present invention. FIG. 2 is a cross sectional view taken along the A—A line in FIG. 1.

The wire saw 1 includes a pair of main rolls 11, 12 disposed on right and left sides of a vessel 10 to which an abrasive liquid a is supplied and a drive roll 13 disposed below the vessel 10. A wire 15 is would on these main rolls 11, 12 and the drive roll 13 several times so that the wire 15 repeatedly moves back and forth in accordance with the rotation of these main rolls 11, 12 and the drive roll 13. Incidentally, a metal wire having a wire diameter of, for example, 0.06 mm to 1.2 mm is usable as the wire 15. As examples of the wire 15 in practical use, a steel wire, a piano wire, a stainless steel wire and the like are usable, and these wires with surface treatment such as brass plating, copper plating or the like given thereon can be also used. A supply reel and a take-up reel which are not shown are disposed outside the main rolls 11, 12 and the drive roll 13 so that the wire 15 supplied from the supply reel moves back and forth while being wound on the main rolls 11, 12 and the drive roll 13 several times to be taken up by the take-up reel.

The wire 15 is wound on the main rolls 11, 12 and the drive roll 13 several times, and as is seen from FIG. 2, the width of the vessel 10 from a front side surface to a rear side surface is larger than the total width of the array of the wire 15 wound on the main rolls 11, 12. Thereby, a large number of the wires 15 move between the main roll 11 and the main roll 12 while being kept parallel to one another at predetermined regular intervals apart from one another. Incidentally, a guide groove or the like, though not shown, is formed on the circumferential surface of each of the main rolls 11, 12 when necessary, in order to keep this parallel state of the wires 15.

Figure 3:
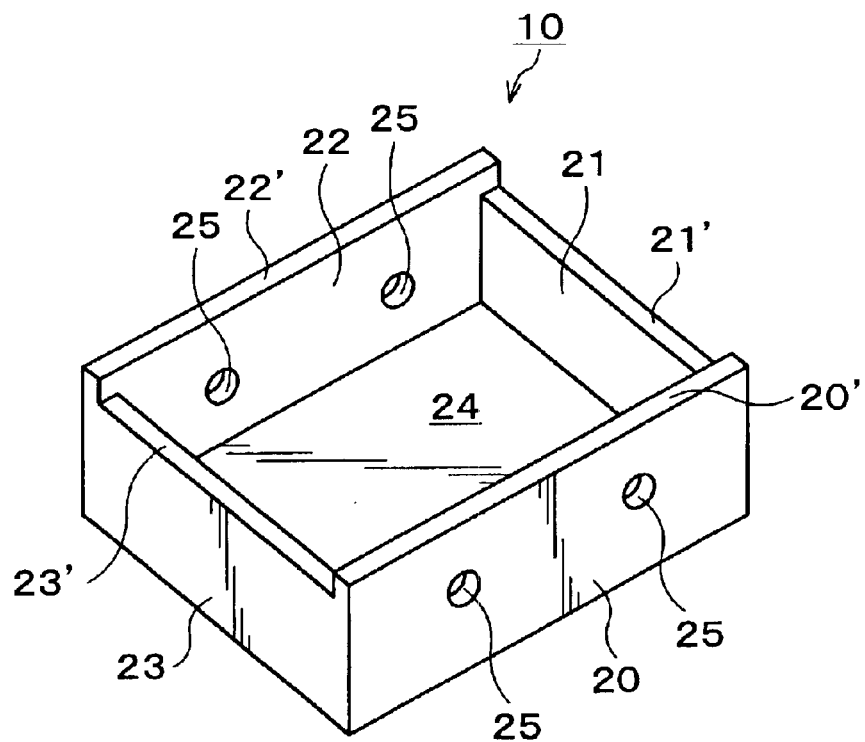
FIG. 3 is a perspective view of a vessel.

As shown in FIG. 3, the vessel 10 is so shaped that an upper surface thereof is open and four side surfaces 20, 21, 22, 23 and a bottom surface 24 thereof are closed. Supply ports 25 for supplying the abrasive liquid a therethrough are formed in the front and rear side surfaces 20, 22, and the abrasive liquid a continuously supplied into the vessel 10 from the supply ports 25 flows out from the upper surface opening of the vessel 10 continuously. In this case, an abrasive liquid which is prepared by dispersing one kind of or two kinds or more of abrasive grains of silicon carbide, alumina, and diamond in oil, or the like is used as the abrasive liquid a. Viscosity of the abrasive liquid a is, for example, 10 mPa·s to 1000 mPa·s.

In the shown example, upper ends 20', 22' of the front and rear side surfaces 20, 22 of the vessel 10 and upper ends 21', 23' of the right and left side surfaces of the vessel 10 are all horizontal, but the upper ends 20', 22' of the front and rear side surfaces 20, 22 are formed to be higher than the upper ends 21', 23' of the right and left side surfaces 21, 23. In other words, the upper ends 20', 22' of the front and rear side surfaces 20, 22 of the vessel 10 are formed in a higher position and the upper ends 21', 23' of the right and left side surfaces 21, 23 of the vessel 10 are formed in a lower position.

Figure 4:
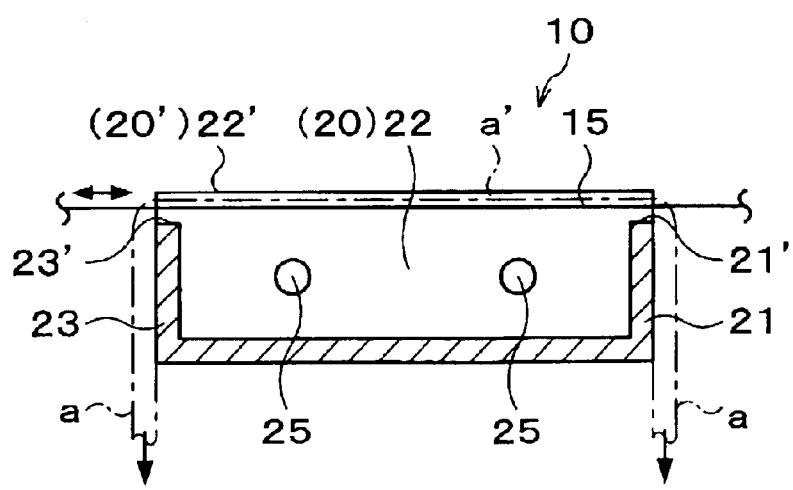
FIG. 4 is an explanatory view showing the state when a wire moves under the liquid level of an abrasive liquid formed in an upper surface opening of the vessel.

Thus, the upper ends 20', 22' of the front and rear side surfaces 20, 22 of the vessel 10 are formed in the higher position and the upper ends 21', 23' of the right and left side surfaces 21, 23 are formed in the lower position so that the abrasive liquid a supplied continuously into the vessel 10 from the supply ports 25 as described above flows out over the upper ends 21', 23' of the right and left side surfaces 21, 23 in the upper surface opening of the vessel 10 to flow down continuously to right and left outside areas of the vessel 10, as shown in FIG. 4. In this case, a liquid level a' of the abrasive liquid a in the upper surface opening of the vessel 10 is higher than the upper ends 21', 23' of the right and left side surfaces 21, 23 of the vessel 10.

The aforesaid main rolls 11, 12 are both horizontal and disposed outside the right and left side surfaces 21, 23 of the vessel 10 to be parallel to each other, sandwiching the vessel 10. Upper end portions of the circumferential surfaces of these main rolls 11, 12 are positioned higher than the upper ends 21', 23' (lower position) of the right and left side surfaces 21, 23 and lower than the upper ends 20', 22' (higher position) of the front and rear side surfaces 20, 22 of the vessel 10. Thereby, the wires 15 which move between the main rolls 11, 12 while kept parallel to one another at the predetermined regular intervals apart from one another as described above are moved horizontally in a position higher than the upper ends 21', 23' (lower position) of the right and left side surfaces 21, 23 and lower than the upper ends 20', 22' (higher position) of the front and rear side surfaces 20, 22 of the vessel 10 in the upper surface opening of the vessel 10. Further, in this case, the wires 15 which move while kept parallel to one another are, as shown in FIG. 4, positioned lower than the liquid level a' of the abrasive liquid a which is formed in the upper surface opening of the vessel 10 so that the wires 15 move under the liquid level a' of the abrasive liquid a (in other words, the supply amount of the abrasive liquid a continuously supplied into the vessel 10 from the supply ports 25 is so adjusted that the wires 15 which are positioned higher than the upper ends 21', 23' (lower position) of the right and left side surfaces 21, 23 and lower than the upper ends 20', 22' (higher position) of the front and rear side surfaces 20, 22 are under the liquid level a' of the abrasive liquid a).

Above the vessel 10, a work W is supported by a raising/lowering mechanism 30. For example, a magnetic material in the shape of a rectangular parallelepiped is an example of the work W This raising/lowering mechanism 30 is operated to lower the work W so that a lower surface side of the work W is pressed onto the wires 15 from the above which are hung between the main rolls 11, 12 in parallel to one another at regular spaced intervals.

In the wire saw 1 as structured above, the abrasive liquid a is supplied continuously into the vessel 10 from the supply ports 25, the abrasive liquid a is caused to flow out continuously over the upper ends 21', 23' of the right and left side surfaces 21, 23 in the upper surface opening of the vessel 10 to the right and left outside areas of the vessel 10. Then, the wires 15 hung between the main rolls 11, 12 in parallel to one another at the predetermined regular intervals are moved back and forth while positioned lower than the liquid level a' of the abrasive liquid a which is formed in the upper surface opening of the vessel 10 (in other words, while the supply amount of the abrasive liquid a which is supplied continuously into the vessel 10 from the supply ports 25 is so adjusted that the wires 15 are under the liquid level a' of the abrasive liquid a). Then, the work W is lowered by the operation of the raising/lowering mechanism 30 so that the lower surface side of the work W is pressed onto the wires 15 from the above which move between the main rolls 11, 12 while kept parallel to one another at the regular spaced intervals. Thereby, the work W can be cut into a large number of thins plates.

Therefore, according to the wire saw 1 in this embodiment, the work W is pressed onto the wires 15 moving under the liquid level a' of the abrasive liquid a so that the cutting operation can be performed in the abrasive liquid a. Consequently, a sufficient amount of the abrasive liquid a can be interposed between cut portions of the work W and the wires 15 for a long time, which eliminates the breakage of the wires 15 due to the shortage of the abrasive liquid a, thereby making it possible to obtain thin pieces having cut surfaces in a good condition.

An example of the preferred embodiment of the present invention is explained above, but the present invention is not limited to the embodiment shown here. For example, it is also suitable that the abrasive liquid a flowing out of the vessel 10 is collected by a drain pan or the like and supplied again to the vessel 10 by an appropriate circulation circuit. In this case, by removing chips through the use of a magnet-type filter or the like before the abrasive liquid a is supplied again to the vessel 10, the cutting operation can be continued for a longer period. Incidentally, the magnet-type filter or the like is preferably cleaned periodically.

The wire saw according to the present invention is effective for use in cutting, for example, a sintered rare earth magnet alloy. Since the sintered rare earth magnet alloy is very hard, having hardness of Hv 500 to 1000, and moreover, has a texture in which hard magnetic crystal grains are dispersed in a grain boundary layer, the magnetic crystal grains get easily chipped, having a hard and fragile property. When a work made of such a sintered rare earth magnet alloy is cut, damage and abrasion of a blade edge is unavoidable in cutting the hard magnetic crystal grains using, for example, a peripheral cutting edge and also the crystal grains fall off. Therefore, the occurrence of cracks is easily caused. On the other hand, according to the present invention, the work is cut while the wires are pressed onto the work in the abrasive liquid whose flow is formed so that the abrasive liquid stably containing the abrasive grains can be interposed between the work and the wires, which makes it possible to obtain cut pieces having very smooth cut surfaces even when the work is the sintered rare earth magnet alloy having the hard and fragile property as described above.

EXAMPLE

A cutting test is conducted in such a manner that a work made of a plate-shaped sintered material which is 30 mm in length×8 mm in external size and which is made of a magnet alloy is cut using a steel wire (brass-plated on the surface thereof) which is 0.18 mm in wire diameter and an abrasive liquid made by dispersing silicon carbide abrasive grains in mineral oil, under the condition that slice thickness is 1.0 mm. The duration of approximately three hours is set for the cutting time, and the cutting operation is carried out with the temperature of the abrasive liquid in the vessel being cooled so as to maintain the temperature between 25° C. and 30° C. while the work is being cut. As a result, cut surfaces of obtained cut pieces are very smooth and neither a saw mark nor a chipped portion is found.

Meanwhile, in a comparison example, a cutting test is conducted in the same manner as in the above embodiment example except that the abrasive liquid is supplied using a nozzle having a dual-tube structure. As a result, the wire is broken during the cutting operation. Moreover, saw marks parallel to the moving direction of the wire are found on the surfaces of cut pieces before the wire is broken, and more saw marks are found in a work positioned distant from the supply nozzle.

What is claimed is:

1. A wire saw, comprising:
   a wire for cutting a work while being pressed onto the work and moving in an axial direction thereof; and
   an abrasive liquid, which is made by dispersing abrasive grains in a dispersion medium, interposed between said work and said wire and,
   wherein a flow of said abrasive liquid is formed, and said wire moves under a liquid level of said abrasive liquid whose flow is formed, and the work is cut by said wire while partially submerged in the abrasive liquid.

2. The wire saw according to claim 1,
   wherein said abrasive liquid is continuously supplied to a vessel to cause said abrasive liquid to flow out of an upper surface opening of the vessel continuously, and said wire moves under the liquid level of said abrasive liquid which is flowing out.

3. The wire saw according to claim 2,
   wherein a higher position and a lower position are provided on upper ends of side surfaces of the vessel and said abrasive liquid flows out at the lower position.

4. The wire saw according to claim 3, further comprising:
   a pair of main rolls, which is disposed on both sides of the vessel, for guiding said wire to move horizontally in the upper surface opening of the vessel,
   wherein said lower position is formed in a position lower than said wire moving between said main rolls, and upper ends of circumferential surfaces of said main rolls are positioned higher than said lower position and lower than said higher position.

5. A method of cutting a work, comprising the step of:
   moving a wire in an axial direction thereof to cut a work while pressing the wire onto the work and interposing an abrasive liquid, which is made by dispersing abrasive grains in a dispersion medium, between the work and the wire,
   wherein a flow of the abrasive liquid is formed, and the wire is pressed onto the work while moving under a liquid level of the abrasive liquid whose flow is formed, and the work is cut by said wire while partially submerged in the abrasive liquid.

* * * * *